(12) United States Patent
Xiong et al.

(10) Patent No.: US 9,126,143 B2
(45) Date of Patent: Sep. 8, 2015

(54) PROCESS AND APPARATUS FOR REMOVAL OF NITROGEN OXIDES, SULFUR OXIDES AND MERCURY FROM OFF GAS THROUGH OXIDIZATION

(75) Inventors: Liang Xiong, Shenzhen (CN); Heguang Zhu, Mississauga (CA)

(73) Assignee: GREENVILLE ENVIROTECH CO., LTD., Shenzhen (CN)

( * ) Notice: Subject to any disclaimer, the term of this patent is extended or adjusted under 35 U.S.C. 154(b) by 105 days.

(21) Appl. No.: 13/881,614

(22) PCT Filed: Oct. 12, 2011

(86) PCT No.: PCT/CN2011/080670
§ 371 (c)(1),
(2), (4) Date: Apr. 25, 2013

(87) PCT Pub. No.: WO2013/053109
PCT Pub. Date: Apr. 18, 2013

(65) Prior Publication Data
US 2013/0224093 A1    Aug. 29, 2013

(51) Int. Cl.
*B01D 53/54*    (2006.01)
*B01D 53/56*    (2006.01)
(Continued)

(52) U.S. Cl.
CPC ............. *B01D 53/60* (2013.01); *B01D 53/64* (2013.01); *B01D 53/76* (2013.01); *B01D 53/50* (2013.01);
(Continued)

(58) Field of Classification Search
CPC ........ B01D 53/56; B01D 53/60; B01D 53/64; B01D 53/50; B01D 53/507; B01J 19/10
USPC .......... 423/235, 242.1, 243.02, 104; 422/168, 422/173, 174, 128
See application file for complete search history.

(56) References Cited

U.S. PATENT DOCUMENTS

| 6,447,740 B1 | 9/2002 | Caldwell et al. |
| 6,503,470 B1 | 1/2003 | Nolan et al. |

(Continued)

FOREIGN PATENT DOCUMENTS

| CN | 101564633 | 10/2009 |
| CN | 101564640 | 10/2009 |
| CN | 201454348 | 5/2010 |
| CN | 101932376 | 12/2010 |
| EP | 0709128 | 5/1996 |

*Primary Examiner* — Matthew E Hoban
*Assistant Examiner* — James Fiorito
(74) *Attorney, Agent, or Firm* — Hamre, Schumann, Mueller & Larson, P.C.

(57) ABSTRACT

Provided is a process for integrating treatment of off gas through $NO_x$ removal, $SO_x$ removal and mercury removal, which could avoid high energy consumption resulting from high temperature required for the reaction, and a corresponding apparatus thereof. The process comprises the splitting of the off gas to a sub-stream off gas flow line as a carrier for the oxidizing agent. In the sub-stream line, a heating chamber is set for the decomposition of the oxidizing agent to form free radicals (when hydrogen peroxide is used, the free radicals formed are hydroxy and peroxy hydroxy free radicals) having stronger oxidative capacity than the original oxidants used, these free radicals carried in the sub-stream off gas are then combined with the unheated mainstream off gas, and react with the reducible contents such as $NO_x$, $SO_x$ and mercury vapor in the off gas to generate $NO_x$, $SO_x$ and mercury ions with higher oxidation state, wherein all the acidic products and mercury ions will be removed in the subsequent gas scrubbing device. The process and apparatus enable substantial reduction of energy required for oxidization and effective removal of $NO_2$ and $SO_x$ as well as the reducible heavy metals such as metallic mercury, owing to only a portion of flue gas used as the carrier for the oxidizing and ionizing of the oxidative agents.

22 Claims, 2 Drawing Sheets

(51) Int. Cl.
  *B01D 53/50* (2006.01)
  *B01D 53/64* (2006.01)
  *B01D 53/60* (2006.01)
  *B01D 53/76* (2006.01)
  *B01J 19/10* (2006.01)

(52) U.S. Cl.
  CPC ............... *B01D 53/507* (2013.01); *B01D 53/56* (2013.01); *B01D 2251/10* (2013.01); *B01D 2251/106* (2013.01); *B01D 2257/602* (2013.01); *B01J 19/10* (2013.01)

(56) References Cited

U.S. PATENT DOCUMENTS

| | | | |
|---|---|---|---|
| 6,878,358 | B2 | 4/2005 | Vosteen et al. |
| 6,972,120 | B2 | 12/2005 | Holste et al. |
| 7,628,967 | B2 | 12/2009 | Johnson |
| 2004/0197251 | A1* | 10/2004 | Williamson .................. 423/235 |
| 2008/0116054 | A1* | 5/2008 | Leach et al. ................ 204/157.3 |
| 2009/0007785 | A1 | 1/2009 | Kimura et al. |

* cited by examiner

PROCESS AND APPARATUS FOR REMOVAL OF NITROGEN OXIDES, SULFUR OXIDES AND MERCURY FROM OFF GAS THROUGH OXIDIZATION

BACKGROUND OF THE INVENTION

1. Field of Invention

The present invention relates to a process and apparatus for removal of nitrogen oxides ($NO_x$), sulfur oxides ($SO_x$) and mercury from flue gas and other industrial off gas, and is within the technical field of industrial off gas disposal and environmental protection.

2. Related Art

Treatment of off gas like flue gas produced in combustion process and similar chemical process is much important in the field of air pollution control. The types of off gases have common characteristics in that they have high temperature (usually above 100° C.), and contain nitrogen oxides and sulfur oxides of a high concentration as well as a small amount of metal oxide or metal vapor. The majority of the nitrogen oxides is formed by the oxidization of nitrogen in air while a small amount of it is formed by the oxidization of nitrogenous compounds contained in fuel. On a basis of total of the nitrogen oxides NO usually accounts for about 90%, and the balance is mostly $NO_2$. The sulfur oxides, including the predominant of $SO_2$ in addition to a small amount of $SO_3$, primarily originate from oxidization of sulfides in fuel. The metal oxides primarily originate from oxidization of metallic compounds in fuel, and upon cooling, most of the metal oxides are mixed into ashes without entering atmospheric environment, and those having ability to enter atmosphere and causing hazard to environment are the metal vapors with low boiling point, such as zero valent metallic mercury.

For control of $SO_x$ (i.e., desulphurization) in flue gas, the wet process, dry process and semi-dry process are used at present. The dry desulphurization process involves injecting the adsorbing and absorbing materials such as the powdered limestone ($CaCO_3$), lime (CaO) or lime hydrate ($Ca(OH)_2$) into a burner or flue after burner to remove $SO_x$. This process is simple, but is low in reaction efficiency, needs a substantial amount of the adsorbing/absorbing materials to be used, has a removal efficiency generally below 70%, and tends to cause scaling on the surface of the heat exchanger, thus frequent rinse on the heat exchanger surface is required. The reacted adsorbing materials increase the concentration of solid particles in the flue gas and impose big challenge to de-dust operation for the flue gas. Moisturizing or injecting $SO_3$ are sometimes required to correspondingly improve the de-dusting efficiency of electrical precipitator. In addition, mixing of the reacted adsorbing material into the fly ashes makes their utilization difficult.

Wet desulphurization process involves absorbing $SO_x$ into alkaline liquids through the use of wet scrubber. Typically the alkaline liquids (NaOH or $Ca(OH)_2$) are used as the scrubbing liquid, and the off gas is brought into the scrubber and well contacts with the scrubbing liquid. The process usually provides the removal efficiency of more than 90%, and the produced sulfate and sulfite may be recovered as byproducts. The main disadvantage is that the cost of equipment is higher than that of the dry process and some water is lost into the flue gas; meanwhile, a certain amount of wastewater is produced, which requires additional treatment. In addition to the above two methods, there is a process known as semi-dry scrubbing. In this process, the scrubbing liquid is fed into the scrubber through a nebulizer as tiny droplets, and only a small amount of the scrubbing liquid is required. Main disadvantage of the process is that the pressure drop required for the off gas to pass through the scrubbing device is large, resulting in greater energy consumption; also there are certain restrictions on the temperature of the gas, and the temperature of the gas entering the scrubbing device is generally required to be near or below the saturation temperature of the scrubbed gas.

For $NO_x$ removal of the flue gas, the selective catalytic reduction (SCR), the selective non-catalytic reduction (SNCR), oxidization, adsorption/absorption, and the like may be used. The selective catalytic reduction involves injecting ammonia into the flue and letting it to combine with the flue gas, and pass through the catalyst bed, where the ammonia reduced $NO_x$ to $N_2$ under the effect of the catalyst. Since this reaction requires a temperature of about 300° C., the catalytic reaction unit has to be mounted in the flue segment between the boiler outlet and the dust precipitator. The catalysts are usually the transition metal oxides, such as $V_2O_5$, $Fe_2O_3$, CuO and the like. The process is relatively simple in structure and high in removal efficiency, the removal rate can typically reach above 80%. The disadvantages are in that the catalyst is expensive, and the catalyst bed needs to be often washed and replaced owing to that the catalyst bed has to be mounted before the dust precipitator; meanwhile, the ammonia is an unstable compound with pungent odor, and there are potential safety risks in its storage and transportation; in order to ensure good removal efficiency, the ammonia gas generally needs to be added in a properly excessive amount, which will bring the risk of ammonia spilling, and ammonia spilling into the environment would cause a serious impact on atmospheric environment. The selective non-catalytic reduction process involves adding the reducing agent, ammonia or urea, into the burner for reducing $NO_x$ at a high temperature of about 1000° C. The process is simple without the use of catalyst, but is low in removal efficiency, which is normally lower than 70%. When injecting the urea, a certain amount of water will inevitably be injected because it is required as the solvent for urea. The evaporation of water will cause a large energy loss. For the adsorbing or absorbing process, the activated carbon or organic metal chelating compounds, such as ferrous ethylene di-amine tetra-acetate ($Fe^{2+}$EDTA) and tri-ethylene diamine cobalt ($Co(En)_3)^{2+}$, are used to adsorb or absorb $NO_x$. Such methods can often simultaneously remove both $SO_x$ and $NO_x$, with high removal efficiency. However, it needs to use a large amount of the adsorbing/absorbing agents which are normally very expensive; in addition, the adsorbing/absorbing agents are difficult to regenerate, and the desorbed $NO_x$ or $SO_x$ still needs to be disposed after the desorption.

For oxidization method of $NO_x$ removal including injection of the oxidizing agent into the flue gas, NO and $NO_2$ are oxidized to $NO_2$ and $NO_3$ which are more soluble in water or the alkaline solution, and thus removed by the absorption in the followed wet scrubbing device, nitrous acid (salts) or nitric acid (salts) are produced respectively. The commonly used oxidizing agents are sodium hypochlorite, hydrogen peroxide, ozone and chlorine dioxide ($ClO_2$) (U.S. Pat. No. 7,628,967 B2), and chlorine gas (U.S. Pat. No. 4,619,608 and U.S. Pat. No. 6,447,740), etc. Sodium hypochlorite and hydrogen peroxide, which are liquid at ambient temperature, are often mixed into the liquid phase in the gas scrubber for use. Ozone, $ClO_2$ and chlorine gas, which are gas at ambient temperature and atmospheric pressure, are usually directly injected into the gas phase for use. The $NO_x$ removal by oxidization could provide high removal efficiency as observed in SCR. The oxidants usually have ability to oxidize $SO_2$ and metallic mercury as well, and the process for absorption and removal of $NO_2$ and $NO_3$ requires similar conditions with that for $SO_2$ and $SO_3$, so the $NO_x$ removal by oxidization also enables the removal of $SO_2$, $SO_3$ and metallic mercury as well, although the dose of the oxidizing agent, reaction conditions, energy consumption and the like are greatly affected by the type and addition means of the oxidizing agents. For example, ozone, a gas having high oxidization activity, needs to be produced in situ; its production consumes substantial electrical energy. For example again, sodium hypochlorite, chlorine dioxide and chlorine gas contain chlorine, which will cause problems with the wastewater treatment and the utilization of oxidative products, and also the oxidation reaction needs high temperature. The use of hydrogen peroxide does not produce new contaminants and affect the quality of byproducts, however it has relatively low oxidization efficiency at normal temperature, and the addition of a large amount of hydrogen peroxide or elevation of reaction temperature is required to obtain the desirable removal efficiency.

The current methods for removal of mercury (elementary mercury and mercury ion) from flue gas primarily include oxidization and activated carbon adsorption, wherein the oxidization uses halogen gases, such as bromine gas, chlorine gas, iodine molecules and compounds (U.S. Pat. No. 6,878, 358 B2 and U.S. Pat. No. 6,447,740), or elementary sulfur and sulfide, including $H_2S$, COS (U.S. Pat. No. 6,972,120 B2) and $Na_2S_4$ (EP 0,709,128 A2). These oxidants react with mercury to produce the mercury compounds having high freezing point or good solubility in the scrubbing liquid; the generated mercury compounds are thereby separated from the gaseous phase and go into the solid residue or residual liquid. In U.S. Pat. No. 6,503,470, it was mentioned that sodium hydrosulfide (NaHS) or other sulfur compounds were added for reaction with mercury to produce mercuric sulfide. U.S. Pat. No. 6,447,740 mentioned that the alkali metal iodine was added for reaction with mercury ion to produce $HgI_2$ precipitate. These reaction reagents except chlorine are for the removal of mercury and have less contribution to the removal of other pollution components in the flue gas. Chlorine gas is the common oxidizing agent and is able to treat other gas components. If these methods are solely used for removal of mercury, the cost will be very high. The activated carbon has less adsorptive capacity for mercury comparing with the aforementioned sulfur or halogen compounds, and usually needs to be treated on its surface (such as by impregnating with bromine gas or soaking in bromic acid) in order to obtain the desirable treatment effect.

In U.S. Pat. No. 7,628,967 B2, it is proposed that $SO_x$, $NO_x$ and mercury are removed simultaneously from the off gas by multistage scrubbing. Firstly all or part of $SO_x$ is absorbed and removed with conventional alkaline liquid; then $NO_x$ and remaining $SO_x$ are oxidized to higher oxidation state with the injection of the oxidizing agent, and the produced $SO_x$ and $NO_x$ in the higher oxidation state are absorbed with the alkaline liquid; finally the residual $NO_x$ and $SO_x$ are removed in a conventional scrubbing step using alkaline liquid. The volatile metallic mercury can be oxidized into ionic mercury in the oxidization section, which can be removed in the subsequent scrubbing device. For the oxidizing agent, hydrogen peroxide, or a mixture of hydrogen peroxide and nitric acid, or a mixture of hydrogen peroxide, nitric acid and chlorous acid, as well as various sodium or potassium salts of chlorinated oxy acids are used. The oxidizing agent is added into the scrubbing liquid for use. Although this process enables simultaneous removal of $SO_x$, $NO_x$ and mercury, it is obvious that it is a long process. In addition, the conditions for oxidization reaction are not specified in this patent.

Using hydrogen peroxide as the oxidizing agent for the $NO_x$ removal from off gas is more advantageous because it is liquid at ambient temperature, thus convenient for transportation and storage, and would not produce harmful byproducts owing to only hydrogen and oxygen are contained therein. Collins et al (2001) revealed that the most preferred temperature for reaction of hydrogen peroxide with NO was 500° C. At this temperature, $H_2O_2$ was decomposed to generate free radical HO., which was further reacted with $H_2O_2$ to generate the free radical $HO_2$., a highly active free radical. A desired mole ratio of $H_2O_2$ to NO was 1:1, with the removal rate up to about 90%, and the presence of sulfur dioxide had no negative but positive effect on the removal of $NO_x$, which is a feature very favorable for simultaneous $SO_x$ and $NO_x$ removal. However, the reaction temperature required is very high for this process, and the temperature at the outlet of the burner which is installed with heat exchanger is usually only about 150° C., so the temperature of the flue gas has to be significantly increased to 500° C. to obtain the desirable $NO_x$ removal efficiency, which is inevitably costly in the consumption of energy. In addition, the increase of the temperature may have negative effect on the subsequent scrubbing operation, because the gas temperature allowing efficient scrubbing must be below the dew point of the scrubbed gas.

In summary, the known processes for $SO_x$ removal of off gas, such as dry scrubbing process, wet scrubbing process or semi-dry scrubbing process, are only effective for $SO_x$ removal, could not achieve simultaneous removal of $NO_x$ and heavy metals; the known processes for $NO_x$ removal of off gas, such as selective catalytic reduction, selective non-catalytic reduction, and adsorbing and absorbing processes, all have the disadvantages such as high cost, undesirable reactions, difficulty in regeneration for the adsorbing/absorbing agents, failure to enable simultaneous removal of $SO_x$ and heavy metals at the same time of $NO_x$ removal. Although the existing oxidative $NO_x$ removal process enables simultaneous removal of $SO_x$ and heavy metal mercury, its cost and efficiency largely depend on the method of using the oxidizing agents, in addition to the type of oxidizing agents. Consumption of large amount of electric current is required for generating ozone, and the oxidizing agents containing chlorine, such as various chlorinated oxy acids (perchloric acid, chloric acid, chlorous acid and hypochlorous acid) and sodium or potassium salts thereof, chlorine gas and chlorine dioxide, may introduce the chlorine-containing compounds into the eluent, which will have adverse effect on the corresponding treatment of waste water and byproduct utilization; in addition, the high reaction temperature or overdose addition is usually required for these processes.

Hydrogen peroxide as the oxidizing agent for $NO_x$ removal, will neither affect the purity of the eluted products, nor have adverse effect on the corresponding treatment of waste water, but needs a relatively high reaction temperature and thus needs all the flue gas to be heated in order to achieve desirable $NO_x$ removal efficiency. It will cause substantial energy consumption, and negative affect on the subsequent scrubbing operation.

SUMMARY OF THE INVENTION

Technical Problem

For solving the above problems in the previous arts for $NO_x$, $SO_x$ and metallic mercury removal in off gas, a process and relevant apparatus are provided for the treatment of off gas. The process can achieve $NO_x$, $SO_x$ and mercury removal simultaneously, while the high energy consumption caused by the maintaining of high reaction temperature can be reduced.

The process described in the application is intended to optimize the use oxidizing agents, with hydrogen peroxide as a representative for $NO_x$ removal, to reduce high energy consumption caused by the maintaining of high reaction temperature, to allow the oxidizing agents to function maximally in oxidation and $NO_x$ removal, and to enable the simultaneous removal of $NO_x$, $SO_x$, and mercury.

Technical Solution

The technical solution adopted in the present invention involves splitting the off gas to obtain a sub-stream as the carrier gas for oxidizing agent, heating it to the decomposition temperature of the oxidizing agent (the oxidizing agent is added and decomposed in the heated section into free radicals such as hydroxy and peroxy hydroxy which have stronger oxidizability) injecting the free radicals carried in the sub-stream off gas back to the unheated mainstream off gas and letting them to react with the reducing ingredients such as $NO_x$, $SO_x$ and mercury vapor in the off gas. Those reductive ingredients are then oxidized to their higher oxidation state. A portion of the produced $NO_x$ and $SO_x$ with high oxidizing state are immediately reacted with water vapor in the off gas and converted to nitrous acid, nitric acid and sulfuric acid etc. These acidic products in turn accelerate the decomposition of the oxidizing agent ($H_2O_2$, for instance). All the acidic products and mercury ions are removed in the subsequent gas scrubbing device. When large volume of sub-stream off gas is employed, the energy needed to heat the sub-stream off gas is significant, after it is mixed with the unheated mainstream, the temperature in the mixed stream is increased significantly. In this case, a heat exchanger can be used to recover a portion of heat energy in the hot gas for heating up the inlet sub-stream off gas. The use of exchanger can reduce the temperature of the oxidized gas at the outlet of the oxidation section, which is beneficial to operation of the subsequent gas scrubbing device.

High temperature is required for the oxidization of NO and $NO_2$ with $H_2O_2$, mainly because $H_2O_2$ can be substantially decomposed at high temperature only. Baldwin and Brattan (1961) revealed that, about 60% of $H_2O_2$ was decomposed at 520° C., wherein the decomposition reaction was represented by the following equation:

$$H_2O_2 = 2HO\cdot$$

$$H_2O_2 = HO\cdot = HO_2\cdot + H_2O$$

$$H_2O_2 + HO_2\cdot = H_2O + O_2 + HO\cdot$$

$$2HO_2\cdot = H_2O_2 + O_2$$

Hydrogen peroxide is thermally decomposed to generate hydroxy free radicals (HO.) and peroxy hydroxy free radicals ($HO_2$.), which in turn are reacted with hydrogen peroxide to generate new free radicals. Such a chain reaction allows hydrogen peroxide to be decomposed quickly and generate large amounts of hydroxy and peroxy hydroxy free radicals which have higher oxidation reduction potential than that of $H_2O_2$, and can more effectively react with NO, $NO_2$ or $SO_2$, or metallic mercury. However, these free radicals also collide one another and regenerate hydrogen peroxide and oxygen, so a dynamic equilibrium will be reached at certain temperature, wherein if the temperature is increased, the equilibrium would shift towards generating more free radicals until the saturation concentration of these radicals will be reached at a certain temperature. Based on this knowledge, we found that, for oxidizing the reductive ingredients in the off gas with hydrogen peroxide, only hydrogen peroxide is required to be heated to its decomposition temperature without requiring to heat all the gases to the saturation decomposition temperature of hydrogen peroxide. However, in order to reduce the possibility for the free radicals generated to collide and form back into the molecular hydrogen peroxide, it is necessary to adjust the concentration of hydrogen peroxide in the sub-stream of the off gas to be below saturated vapor concentration. In this way, both significantly reducing energy required for heating the entire off gas and maximally ensuring the yield of free radicals therefore the activity of the hydrogen peroxide, could be achieved, so the reductive ingredients (NO, $NO_2$ or $SO_2$ and metallic mercury) in the off gas can be oxidized and removed with low cost and high efficiency.

The present invention is to provide an apparatus for removal of nitrogen oxides, sulfur oxides and mercury from the off gas through oxidization. The apparatus including an off flue gas main pipe, a sub-stream branch pipe, and an oxidizing agent injection device, wherein 1. the inlet end and the outlet end of the sub-stream branch pipe are respectively connected to the upstream and the downstream of the off gas main pipe, wherein the downstream of the off gas main pipe (after the spot where the outlet of the sub-stream branch is opened to) is connected to a scrubber;

2. a control valve and a blower are installed near the inlet end in the sub-stream branch pipe, for controlling and adjusting the air flow rate in the sub-stream branch pipe; and a heating reaction chamber is set in the sub-stream branch pipe and near its outlet end, wherein a heater is installed within the heating reaction chamber;

3. the oxidizing agent injection device includes an oxidizing agent storage tank, a delivery pump and a delivery pipeline, wherein the opening of the delivery pipeline is connected to the heating reaction chamber at a point downstream of the heater. A diffusion distributor or nozzle is equipped at the outlet opening of the sub-stream pipe for the heated and reacted sub-stream being better distributed into the mainstream.

As a prefer option, in the off gas main pipe at a spot a little downstream of the inlet opening of the sub-stream branch pipe a gas flow control valve can be set for controlling the flow rate of the sub-stream flow.

Further, the said heater is an electric heater.

Preferably, the place where opening of the delivery pipeline in the oxidizing agent injection device is connected is located in the heating reaction chamber after the heater and near the inlet end as much as possible, such that the injected oxidizing agent is fully mixed with the sub-stream off gas, be fully heated and decomposed into hydroxy and peroxy hydroxy free radicals.

The said oxidizing agents include hydrogen peroxide and other oxidizing agents which can be decomposed into the free radicals at the high temperature, including chlorine gas, $ClO_2$, hypochlorous acid, chlorous acid, chloric acid, perchloric acid, sodium or potassium salts thereof, mixtures thereof, or mixtures of these oxidants with the catalysts accelerating their decomposition.

Further, the end of the delivery pipeline of the said oxidizing agent injection device is installed with a nozzle or atomizer. The type of the said nozzle includes an ultrasound nozzle or a Venturi nozzle, wherein for the ultrasound nozzle, a charging pump can be installed in the delivery pipeline to drive the injection of the oxidizing agent; for the Venturi nozzle, an oxidizing agent injection control valve is installed in the delivery pipeline for controlling the injection rate of hydrogen peroxide.

The Venturi nozzle is designed according to the Venturi effect, wherein the so-called Venturi effect means that when the fluid enters a space with smaller flow cross-section from a pipe with bigger flow cross-section, the static pressure of the fluid is lowered. The negative pressure caused by the gas flow with high speed in Venturi throat is used to suck the liquid into the throat and let the liquid fully mix with the gas, and form fine mist spray at a downstream spout under the effect of fluid shear force. Further, if a relatively high proportion of the off gas is shunted into the sub-stream branch pipe, for example, a ratio of more than 10%, and when the sub-stream off gas flows back into the mainstream, the temperature of the mixed gas will be substantially increased; in this case, a heat-exchanger can be installed to recover a portion of thermal energy from the mixed gas for heating up the sub-stream off gas having a relatively low temperature.

Another object for the present invention is to provide a process for removal of nitrogen oxides, sulfur oxides and mercury from the off gas through oxidization by using the aforesaid apparatus. The process includes the following steps:

1. splitting the off gas: the sub-stream branch pipe is set between the upstream and the downstream of the flue gas main pipe to drive a portion of the off gas for procession;

2. mixing and heating: the flow of the sub-stream off gas, thus the flow of the main stream off gas are controlled and adjusted by the gas flow control valve installed in the off gas main pipe, and the gas flow control valve and the blower installed in the off gas sub-stream branch pipe; in the heating reaction chamber, the oxidizing agent injected through nozzle is fully mixed with the sub-stream off gas and heated;

3. flowing back and scrubbing: the sub-stream off gas carrying high oxidative free radicals is fed back into the off gas main pipe and fully mixed with the main stream for reaction prior to enter into the subsequent scrubbing device.

In particular, provided is a process for removal of $NO_x$, $SO_x$ and mercury from the off gas by using hydrogen peroxide, which includes the following steps:

1. splitting off gas: the sub-stream branch pipe is installed between the upstream and downstream of the off gas main passage pipe, for driving a portion of the off gas for procession;

2. mixing and heating: the flow of the sub-stream off gas, thus the flow of the main-stream off gas are controlled and adjusted by the gas flow control valve installed in the off gas main pipe, and the gas flow control valve and the blower installed in the off gas branch pipe; in the heating reaction chamber, the hydrogen peroxide injected through nozzle is fully mixed with the sub-stream off gas, and heated and decomposed into more oxidative hydroxy and peroxy hydroxy free radicals having strong oxidation capability;

3. flowing back and scrubbing: the sub-stream off gas carrying the high oxidative free radicals is fed back into the off gas main pipe and fully mixed with the main-stream off gas, and after a reaction time of 0.4-5.0 seconds the mixed off gas enters the subsequent scrubbing device.

Further in the said process, hydrogen peroxide is fed through the oxidizing agent injection device into the heating reaction chamber in the off gas branch pipeline at a certain flow rate, and fully mixed with the sub-stream off gas. It is retained in the heating reaction chamber for 0.2-4.0 seconds, and preferably 0.5-1.0 second. The heater installed in the heating reaction chamber allows the temperature of the sub-stream off gas to be increased to the optimal decomposition temperature of $H_2O_2$; at this temperature, $H_2O_2$ is wholly or partially decomposed into free radical HO. and $HO_2$. etc.

In Step 2 of the process, a portion of hydrogen peroxide injected in the heating reaction chamber and the produced free radicals react immediately with the reductive contents (NO, $NO_2$, $SO_2$ and Hg vapor) in the sub-stream off gas, and converts them into the corresponding oxides in the higher oxidation state ($NO_2$, $NO_3$, $SO_3$) and divalent mercury ion ($Hg^{2+}$), wherein a portion of the acidic oxides in the higher oxidation state are reacted with water vapor in the off gas to produce the corresponding acids ($HNO_2$, $HNO_3$, $H_2SO_4$), and these produced acids in turn promote further decomposition of $H_2O_2$.

In Step 3, the remaining and freshly generated free radicals as well as the remaining hydrogen peroxide from the heating reaction chamber are fed together with the sub-stream off gas back into the off gas main pipe and reacted with the reductive contents (NO, $NO_2$, $SO_2$ and Hg vapor) in the mainstream to generate the corresponding oxides in the higher oxidation state ($NO_2$, $NO_3$, $SO_3$) and divalent mercury ion ($Hg^{2+}$), and a portion of the acidic oxides in the higher oxidation state further react with water vapor in the off gas to generate new acids ($HNO_2$, $HNO_3$, $H_2SO_4$). Finally, all of the produced $NO_2$, $NO_3$, $SO_3$, $HNO_2$, $HNO_3$, $H_2SO_4$ and mercury ion are removed in the subsequent gas scrubbing device.

In the said process above, the flow of hydrogen peroxide injected into the heating reaction chamber is determined by testing, wherein the mole ratio of $H_2O$, to $NO_x$ in original off gas ranges from 2 to 0.5:1, and the preferred mole ratio of $H_2O_2$ to $NO_x$ is 1:1. Owing to the promotion effect of $SO_2$ on the oxidization of $NO_x$ by $H_2O_2$, the influences of $SO_2$ concentration on the removal of NOx are not considered for determining the dose of hydrogen peroxide; also owing to the content of metallic mercury usually far below that of $NO_x$, the influences of metallic mercury are also not considered for the determination of the addition dose of $H_2O_2$.

In the process above, the optimal decomposition temperature of $H_2O_2$ is associated with the composition of the off gas, the concentration of the $H_2O_2$ used, and whether the catalytic factors promoting $H_2O_2$ decomposition are present or not, and is usually in the range of 200 to 600° C., with 300 to 500° C. being preferred. The ratio of the sub-stream flow rate (volumetric) to the mainstream flow rate is usually in the range of 0.5 to 50%, with 1 to 10% being preferred. The most preferred ratio of the sub-stream flow rate to the mainstream flow rate is determined by the $H_2O_2$ concentration required for oxidizing the $NO_x$ in the off gas main pipe, which is determined by the aforesaid optimal mole ratio of $H_2O_2$ to $NO_x$, and the saturation concentration of $H_2O_2$ at high temperature in the off gas branch pipe.

The injection device for hydrogen peroxide can be selected from a variety of nozzles or atomizers which includes the ultrasound nozzle and the Venturi nozzle, such that $H_2O_2$ can be distributed into the sub-stream off gas in the form of vapor or tiny droplets, and be partially or entirely decomposed into hydroxy free radicals. The resulted oxidative gas which contains the free radicals is then mixed into the main stream off gas in the main pipe via a secondary nozzle or diffuser and reacts with the reductive gases contained in the main stream and oxidizes them into their higher oxidative state, which are then entered and removed in the subsequent scrubbing device. The zero valent metallic mercury is oxidized into the divalent mercury ions, which are also removed in the subsequent scrubbing device.

The said $H_2O_2$ can be the form of aqueous solution at higher concentration (such as more than 80% $H_2O_2$), or lower concentration (such as 30% $H_2O_2$), with its concentration being required to be at least 10%. Because the boiling point is 150.2° C. for $H_2O_2$ and 100° C. for water, as long as the gas temperature is above 150.2° C., the relative concentration of the vaporized $H_2O_2$ and water in the gas remains constant, regardless the type of $H_2O_2$ aqueous solution used; if the temperature is further increased, more and more $H_2O_2$ is decomposed, and the relative concentration of water is increased. Because the water molecules are stable, it only has minor effects on the oxidization capability of $H_2O_2$ and the hydroxy free radicals generated by its decomposition.

As an option, a certain amount of catalysts which can accelerate the $H_2O_2$ decomposition can be added in the $H_2O_2$ aqueous solution. Those catalysts include the inorganic acids such as nitric acid, hydrochloric acid and sulfuric acid, and various ferric or ferrous salts (the solution mixed with ferric or ferrous salts and $H_2O_2$ is known as Fenton's reagent)), with the mixed ratio of these inorganic acid, ferric or ferrous salts to $H_2O_2$ being less than or equal to 1:1. These chemical reagents may be added to promote decomposition of $H_2O_2$ and generate hydroxy free radicals, such that $H_2O_2$ is decomposed at lower temperature. Because the addition of the aforesaid catalysts could cause $H_2O_2$ to be unstable, these catalysts and $H_2O_2$ must be stored separately in different storage tank prior to mixing.

When the sub-stream off gas takes up a larger proportion of total off gas, for example, the volumetric ratio of the sub-stream to mainstream is greater than 10%, after the sub-stream flows back into the mainstream pipe to mix with the unheated mainstream off gas, the temperature of the mixed gas will be substantially increased. In this case, a heat-exchanger may be used to recover a portion of thermal energy from the hot gas at the outlet to heat the sub-stream off gas at the inlet of the branch pipeline which having the relatively low temperature. In this way, the total energy consumption can be further reduced; on the other hand, the temperature of oxidized gas can be decreased, which may facilitate the operation of the subsequent gas scrubbing device.

Advantageous Effects

The apparatus and process described in the present invention have the following advantages:

1. energy required for the oxidization is substantially reduced, meanwhile and $NO_2$ and $SO_x$ as well as the reducible heavy metals such as metallic mercury can be effectively removed, owing to that only a portion of flue gas is used as the carrier for the oxidization and ionization of the oxidative agents;

2. the process can be conveniently applied to any existing $SO_x$ removal process which uses wet scrubbing method, and the effects of $NO_x$ and heavy metals removal can be gained by renovation or upgrading of existing facility.

3. the process may also be independently used for $NO_x$ and heavy metals removal after the $SO_x$ removal device, wherein the produced byproducts are relatively pure and convenient for reutilization due to using hydrogen peroxide or hydrogen peroxide based oxidizing agents.

BRIEF DESCRIPTION OF THE DRAWINGS

The graphs and detailed description given below are only for that the present invention can be more fully understood, and are not to limit the present invention.

FIG. 3 is a schematic structural diagram of still another embodiment of the said apparatus dealt with in the present invention, wherein, 1 represents the upstream flue gas inlet, 2 represents the off gas main pipeline, 3 represents the sub-stream branch pipeline, 4 represents the heating reaction chamber, 5 represents the downstream flue gas outlet, 6 represents the off gas main pipe control valve, 7 represents the sub-stream branch pipe control valve, 8 represents the blower, 9 represents the heater, 10 represents the distributor, 11 represents the oxidizing agent storage tank, 12 represents the charging pump, 13 represents the nozzle, 14 represents the oxidizing agent injection control valve, 15 represents the Venturi tube, 16 represents the heat exchanger, and 17 represents the delivery pipeline.

DETAILED DESCRIPTION OF THE INVENTION

The said process dealt with in the present invention is further described using the following specific mode of implementation, for the purpose of being better understood but not to limit the technical content in the application. Although the present invention has been described above, the content of the invention is not limited to this, it also embraces various modifications and variations which are apparent to those ordinarily skilled in the art. All those modifications and variations are protected as part of the present invention as long as they are in line with the spiritual essence, feature and scope of the present invention.

Embodiments 1-3 are three embodiments of the $NO_x$, $SO_x$ and mercury removal apparatus dealt with in the present invention.

Embodiment 1

Figure 1:
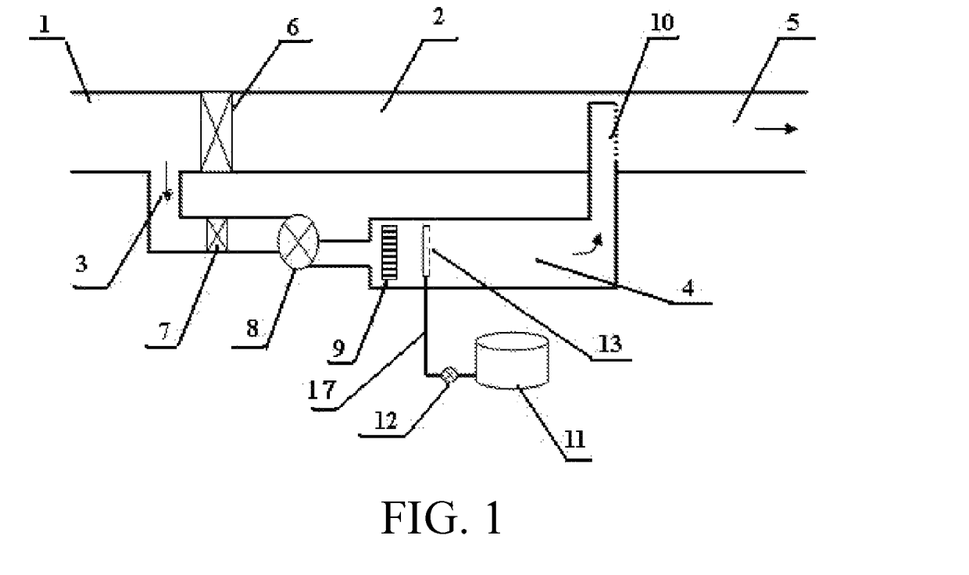
FIG. 1 is a schematic structural diagram of one embodiment of the said apparatus contained in the present invention.

The apparatus depicted in FIG. 1 is composed of an off gas main pipe, a sub-stream branch pipe and an oxidizing agent injection device, wherein the inlet end and the outlet end of the sub-stream branch pipe 3 are connected respectively to the upstream and downstream between inlet 1 and an outlet 5 of the off gas main pipe 2, and the flue gas outlet 5 of the off gas main pipe 2 is connected to a scrubbing device; near the inlet end of the sub-stream branch pipe 3 a sub-stream branch pipe control valve 7 and a blower 8 are installed; moreover, a control valve 6 is also set in the off gas main pipe 2 at the location near to and downstream of inlet end opening of the sub-stream branch pipe 3 for controlling and adjusting the air flow rate of the sub-stream branch pipe 3; near the outlet end in the sub-stream branch pipe 3, there is a heating reaction chamber 4; a electrical heater 9 is installed in the heating reaction chamber 4; the oxidizing agent injection device is composed of an oxidizing agent storage tank 11 and a delivery pipeline 17, and the opening of the delivery pipeline 17 is connected to the downstream of the heater 9 within the heating reaction chamber 4 which is directly connected to the off gas main pipe 2, wherein a distributor 10 is installed at the outlet end of the sub-stream branch pipe 3, and preferably, the opening of the delivery pipeline 17 in the oxidizing agent injection device is installed as near the inlet end of the chamber 4 as possible such that the injected oxidizing agent can be mixed fully with the sub-stream off gas and heated in the heating reaction chamber 4; the end of the delivery pipe 17 in the oxidizing agent injection device is installed with a nozzle 13, and the nozzle 13 is an ultrasound nozzle; a charging pump 12 is installed in the delivery pipeline 17 to drive the injection of the oxidizing agent.

Embodiment 2

Figure 2:
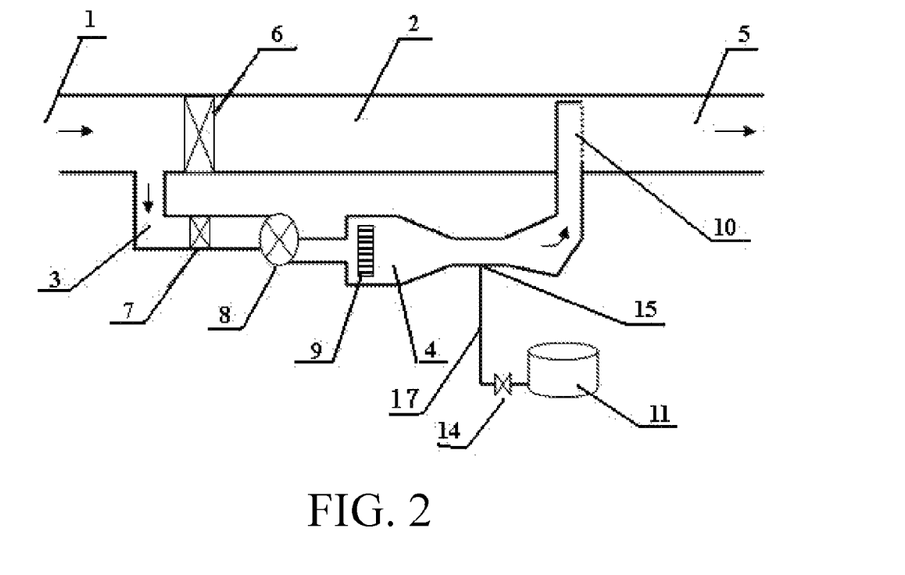
FIG. 2 is a schematic structural diagram of another embodiment of the said apparatus dealt with in the present invention.

The apparatus depicted in FIG. 2 has a similar structure as that in Embodiment 1, except that at the end of the delivery pipeline 17 of the oxidizing agent injection device there installed a Venturi tube to suck the oxidizing agent; meanwhile, the oxidizing agent injection control valve 14 was installed in the delivery pipe 17 and near the oxidizing agent storage tank 11, for controlling the injection rate of hydrogen peroxide.

Embodiment 3

Figure 3:
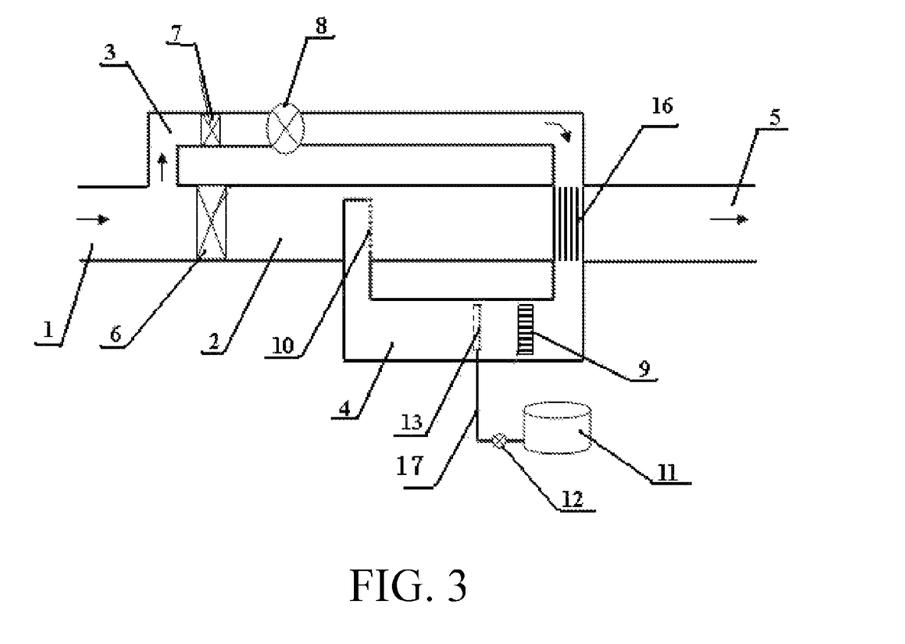

The structure of the embodiment 3 was shown in FIG. 3 and was generally the same as those in FIG. 1 and FIG. 2, wherein a large proportion (for example more than 10%) of the off gas is shunted into the sub-stream branch pipe, the sub-stream off gas is fed back into the mainstream pipe and mixed with the unheated mainstream off gas. In this embodiment the temperature of the mixed off gas is substantially increased; to recover thermal energy in the mixed off gas, a heat exchanger 16 was installed in the mainstream pipeline to conduct a portion of the heat from the hot gas of the mixture to the inlet off gas of the sub-stream branch pipe having relatively low temperature.

Embodiment 4

The flue gas in a power plant was treated using the process of the present invention, wherein the flue gas had a total flow rate of 220,000 m$^3$/h, contained 1700 mg/m$^3$ $SO_2$, 1300 mg/m$^3$ $NO_x$, and had a temperature of 150° C. The flow rate of the sub-stream was set to be 10% of total flow rate, i.e. 22,000 m$^3$/h and was controlled by a valve regulation; the sub-stream flue gas was electrically heated to 500° C.; $H_2O_2$ was injected at the $H_2O_2$ to $NO_x$ ratio of 1:1 and at the feeding rate of 324 kg/h by an ultrasound atomizer, and the concentration of $H_2O_2$ in the sub-stream flue gas was approximately 14.7 g/m$^3$. Because the saturated vapor pressure of $H_2O_2$ at 500° C. was above 1 atmosphere, the $H_2O_2$ concentration (14.7 g/m$^3$) was much lower than the saturated vapor concentration at this condition. The $H_2O_2$ which entered into the heating chamber was immediately vaporized into the gas and retained in the chamber for about 0.8 second, such that most of $H_2O_2$ entered the heating section was decomposed into HO. and HO$_2$. free radicals. These radicals, together with the hydrogen peroxide without decomposition, reacted firstly with $NO_x$, $SO_x$ and metallic mercury in the sub-stream flue gas to generate $NO_x$ and $SO_x$ with higher oxidation state, divalent mercury ion, and some nitric, nitrous and sulfuric acids which promoted the oxidative activity of $H_2O_2$, such that the remaining $H_2O_2$ is further decomposed into the free radicals, these newly born free radicals and other remaining free radicals, together with the sub-stream flue gas were flowed back into the mainstream to react with the reducible contents such as NO in the mainstream; these reducible contents were oxidized into the compounds with higher oxidation state, and part of these oxidized compounds were in turn reacted with water vapor to generate some acids, such as nitric acid and nitrous acid. The flue gas after combination and reaction had a temperature of about 170° C., slightly higher than the inlet temperature of flue gas, was treated by a cooling section to let the temperature to be lower than 100° C., and then fed into the flue gas scrubber where $NO_2$, $NO_3$, $SO_2$, $SO_3$, $Hg^{2+}$, and nitric acid, nitrous acid, sulfuric acid, sulfurous acid and the like in the flue gas were removed. The scrubber could be used includes any commercially available Venturi or packed scrubber. In this embodiment, the commercialized scrubber with a trademark REITHER™ was preferably used. The removal rate was up to 90% for NO, 99% for $SO_2$ and 90% for metallic mercury. Compared to the process to heat the whole flue gas, the energy was saved by 90% approximately.

Embodiment 5

For a flue gas same as that described in Embodiment 4, the flow rate of the sub-stream was set to be 1% of total flow rate, i.e. 2,200 m$^3$/h and was controlled by a sub-stream air pump and a flow control device; the sub-stream flue gas was electrically heated to 500° C.; $H_2O_2$ was added at the mole ratio ($H_2O_2$ to $NO_x$) of 1:1 and at the flow rate of 324 kg/h, and injected by a atomizer adopted Venturi nozzle (see FIG. 2). The concentration of $H_2O_2$ in the sub-stream was 147 g/m$^3$. Because the saturated vapor pressure of $H_2O_2$ at 500° C. was above 1 atmosphere, the concentration (147 g/m$^3$) of $H_2O_2$ in the sub-stream flue gas at this point was below the saturated vapor concentration at this condition (greater than 200 g/m$^3$). After entered into the heating chamber, $H_2O_2$ was immediately vaporized into the gaseous form, and retained in the heating chamber for approximate 0.5 second, and then was flowed back into the mainstream flue to mix and react with the mainstream flue gas. After reaction, the flue gas had a temperature of approximate 150° C., almost the same as that of the inlet flue gas. It was then cooled down in a cooling section to allow the temperature to be lower than 100° C., and then fed into a scrubbing device where $NO_2$, $NO_3$, $SO_2$, $SO_3$, $Hg^{2+}$, and nitric acid, nitrous acid, sulfuric acid, sulfurous acid and the like in the flue gas were removed. The scrubber used was the commercially available Venturi scrubbing device with a trademark REITHER™. The removal rate was up to 80% for NO, 99% for $SO_2$ and 80% for metallic mercury. Compared to the process with the whole flue gas to be heated, the energy consumption was saved by more than 95%.

Embodiment 6

For a flue gas same as that described in Embodiment 4, the flow rate of the sub-stream flue gas was set to be 30% of total flow rate, i.e. 66,000 m$^3$/h, and was adjusted by the regulating valves installed in the mainstream pipeline; the sub-stream flue gas was electrically heated to 500° C.; $H_2O_2$ was added at the mole ratio ($H_2O_2$ to $NO_x$) of 1:1 and at a flow rate of 324 kg/h, and was injected with a ultrasound nozzle. The concentration of $H_2O_2$ in the sub-stream flue gas was about 5 g/m$^3$. The $H_2O_2$ was immediately vaporized into the gaseous phase after entered into the heating chamber, and retained in the chamber for about 0.5 second. In the heating chamber, the reducible gas in the sub-stream flue gas was first oxidized; the generated inorganic acids promoted the further decomposition of $H_2O_2$. At the end of the heating chamber, the remaining hydroxy and peroxy hydroxy free radicals were fed into the mainstream flue to react with the mainstream flue gas. After the reaction, the flue gas had the temperature of about 255° C. A heat exchanger was installed in the main stream pipe to conduct a portion of the heat contained in the mixed flue gas after the reaction to the inlet sub-stream flue gas (FIG. 3). After heat exchanger, the inlet temperature of the sub-stream flue gas was increased to near 220° C. and the temperature of the mixed flue gas was decreased to 230° C. The mixed flue gas was then cooled down in a quench section to allow the temperature to decrease to below 100° C., and then fed into a scrubbing device where $NO_2$, $NO_3$, $SO_2$, $SO_3$, $Hg^{2+}$, and nitric acid, nitrous acid, sulfuric acid, sulfurous acid and the like in the flue gas were removed. The scrubber used was the commercially available Venturi scrubbing device with a trademark of REITHER™. The removal rate was up to 90% for NO, 99% for $SO_2$ and more than 90% for metallic mercury. Compared to the process with the whole flue gas was heated, energy consumption was saved by more than 80%.

Embodiment 7

For a flue gas same with that described in Embodiment 4, the flow rate of the sub-stream flue gas was set to be 10% of total flue gas flow rate, i.e. 22,000 m³/h, by adjusting the control valve and the air pump; $ClO_2$ was used as the oxidizing agent and prepared by the reaction of chlorous acid with concentrated hydrochloric acid. The sub-stream flue gas was electrically heated to 500° C. $ClO_2$ was added at the mole ratio ($ClO_2$ to $NO_x$) of 1:3 and at the flow rate of 229 kg/h. The process similar to that in Embodiment 4 was used, and nitrogen dioxide, nitrogen trioxide, sulfur dioxide, sulfur trioxide, divalent mercury, nitric acid, nitrous acid, sulfuric acid, and hydrochloric acid generated in the oxidation reaction were removed in a Venturi scrubber. The removal rate was up to 90% for $NO_x$, 99% for $SO_2$ and more than 90% for metallic mercury.

What is claimed is:

1. An apparatus configured for removal of nitrous oxides ($NO_x$), sulfur oxides ($SO_x$), and mercury from off gas, the apparatus comprising:
    an off gas main pipe having an upstream portion and a downstream portion;
    a sub-stream branch pipe including an inlet end connected to the upstream portion of the off gas main pipe and an outlet end connected to the downstream portion of the off gas main pipe;
    a control valve and a blower disposed within the sub-stream branch pipe, the control valve and the blower being located relatively closer to the inlet end of the sub-stream branch pipe than the outlet end of the sub-stream branch pipe and configured for adjusting a flow rate of sub-stream off gas through the sub-stream branch pipe;
    a heating reaction chamber disposed within the sub-stream branch pipe and relatively closer to the outlet end of the sub-stream branch pipe than the inlet end of the sub-stream branch pipe, the heating reaction chamber housing a heater therein;
    a scrubbing device connected to the off gas main pipe downstream of the outlet end of the sub-stream branch pipe;
    an oxidizing agent injection device, the oxidizing agent injection device including:
        an oxidizing agent storage tank, and
        a delivery pipe, wherein an opening of the delivery pipe is connected downstream of the heater and within the heating reaction chamber; and
    a distributor attached at the outlet end of the sub-stream branch pipe.

2. The apparatus according to claim 1, wherein the off gas main pipe comprises a gas flow control valve configured for regulating a flow and a flow rate of gas in the sub-stream branch pipe and the off gas main pipe, the gas flow control valve being located downstream of the inlet opening of the sub-stream branch pipe.

3. The apparatus according to claim 1, wherein the heater is an electric heater.

4. The apparatus according to claim 1, wherein the opening of the delivery pipe is located within the heating reaction chamber and relatively closer to the inlet end of the heating reaction chamber than the outlet end of the heating reaction chamber, so that an injected oxidizing agent is fully mixed with a sub-stream off gas and heated in the chamber.

5. The apparatus according to claim 4, wherein the oxidizing agents comprise hydrogen peroxide and other oxidizing agents decomposable into free radicals at high temperature.

6. The apparatus according to claim 5, wherein the other oxidizing agents comprise chlorine gas, $ClO_2$, hypochlorous acid, chlorouous acid, chloric acid, perchloric acid, sodium or potassium salts thereof, mixtures thereof, or mixtures thereof with catalysts which are capable of accelerating the decomposition of the oxidizing agents.

7. The apparatus according to claim 1, wherein an end of the delivery pipe in the oxidizing agent injection device is attached with one of a nozzle or an atomizer.

8. The apparatus according to claim 7, wherein the nozzle comprises one of an ultrasound nozzle having a charging pump set in the delivery pipe configured to drive injection of the oxidizing agent or a Venturi nozzle having a control valve set in the delivery pipe to control an injection rate of oxidizing agent.

9. A process for removal of nitrous oxides ($NO_x$), sulfur oxides ($SO_x$), and mercury from off gas through oxidization by using the apparatus according to claim 1, the method comprising:
    shunting the off gas to be processed into a sub-stream branch pipe, the sub-stream branch pipe being installed between an inlet at an upstream of the main flue gas pipe and an outlet at a downstream of the main flue gas pipe;
    controlling a flow of sub-stream off gas with a gas flow control valve installed in the main flue gas pipe and/or another gas flow control valve and a blower installed in the sub-stream branch pipe;
    injecting an oxidizing agent;
    mixing and heating the sub-stream off gas with the injected oxidizing agent; and
    feeding the sub-stream off gas having high oxidative free radicals back into the main flue gas pipe such that the off gas is fully mixed with the sub-stream off gas prior to entry into a subsequent scrubbing device.

10. The process according to claim 9, wherein
    the injecting the oxidizing agent comprises injecting hydrogen peroxide; and
    the mixing and heating the sub-stream off gas with the hydrogen peroxide comprises:
    decomposing the hydrogen peroxide into hydroxy and peroxy hydroxy free radicals having stronger oxidative capacity than hydrogen peroxide.

11. The process according to claim 10, wherein the injecting the hydrogen peroxide comprises:
    injecting the hydrogen peroxide via an oxidizing agent injection device into the sub-stream branch pipe and is mixed fully with the sub-stream off gas; and
    retaining the hydrogen peroxide within the heating reaction chamber for 0.2-4.0 seconds.

12. The process according to claim 11, wherein the retaining the hydrogen peroxide within the heating reaction chamber is for 0.5-1.0 second.

13. The process according to claim 10, further comprising:
    determining an amount of the hydrogen peroxide for the injection flow is according to a mole ratio of the hydrogen peroxide to the $NO_x$ in the off gas of 2.0 to 0.5:1.

14. The process according to claim 13, wherein the mole ratio of the hydrogen peroxide in the injection flow to $NO_x$ in the off gas is 1:1.

15. The process according to claim 10, wherein the decomposing the hydrogen peroxide is at a temperature in a range of 200 to 600° C.

16. The process according to claim 15, wherein the decomposing the hydrogen peroxide is at the temperature in the range of 300 to 500° C.

17. The process according to claim 10, wherein a ratio of a flow rate of the sub-stream off gas to a flow rate of the off gas is 0.5 to 50%.

18. The process according to claim 17, wherein the ratio of the flow rate of the sub-stream off gas to the flow rate of the off gas is 1 to 10%.

19. The process according to claim 10, wherein the hydrogen peroxide is an aqueous solution at a purity of more than 10%.

20. The process according to claim 10, wherein an aqueous hydrogen peroxide solution comprises a catalyst accelerating decomposition of the hydrogen peroxide.

21. The process according to claim 20, wherein the catalyst comprises inorganic acids or ferric or ferrous salts thereof.

22. The process according to claim 21, wherein a mixing mole ratio of the inorganic acids, or ferric or ferrous salts thereof, to the hydrogen peroxide is less than or equal to 1:1.

\* \* \* \* \*